(12) United States Patent
Kasuya

(10) Patent No.: US 7,588,252 B2
(45) Date of Patent: Sep. 15, 2009

(54) GASKET

(75) Inventor: Tadashi Kasuya, Utsunomiya (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 71 days.

(21) Appl. No.: 11/541,619

(22) Filed: Oct. 3, 2006

(65) Prior Publication Data

US 2007/0090609 A1 Apr. 26, 2007

(30) Foreign Application Priority Data

Oct. 21, 2005 (JP) ............................. 2005-306894

(51) Int. Cl.
*F02F 11/00* (2006.01)

(52) U.S. Cl. ..................................... 277/598

(58) Field of Classification Search .................. 277/592, 277/593, 598

See application file for complete search history.

(56) References Cited

U.S. PATENT DOCUMENTS 6,283,480 B1 * 9/2001 Miura et al. ................. 277/593

FOREIGN PATENT DOCUMENTS

DE     19725986 A1 *   1/1999

* cited by examiner

*Primary Examiner*—Vishal Patel
(74) *Attorney, Agent, or Firm*—Manabu Kanesaka

(57) ABSTRACT

A metal laminate gasket is formed of at least three metal plates, i.e. first to third metal plates assembled together. A connecting portion is formed for partially connecting the first and second metal plates. The third metal plate has an opening located at a position facing the connecting portion for receiving the connecting portion therein. Thus, local pressure formed at the connection portion when the gasket is tightened is eliminated.

3 Claims, 5 Drawing Sheets

GASKET

BACKGROUND OF THE INVENTION AND RELATED ART STATEMENT

The present invention relates to a metal-laminate type gasket, such as a cylinder head gasket installed between two members for sealing, such as a cylinder head and a cylinder block and the like. More specifically, the metal-laminate type gasket is formed of more than three metal plates, wherein two of the metal plates are connected together.

In a state that the cylinder head gasket is sandwiched between the cylinder head and the cylinder block (cylinder body) of an engine for an automobile, the cylinder head gasket is tightened by head bolts to seal fluids, such as fuel gas, oil, cooling water and the like.

In a metal-laminate type gasket laminating a plurality of metal plates of the cylinder head gasket, as a method for connecting two plates at a local connecting portion, there is proposed a method in which a claw portion formed in a metal constituting plate is inserted into a fixation hole in the other metal constituting plate to thereby engage the claw portion to a periphery of the fixation holes.

One of the methods, a steel laminate gasket is provided, which is formed of a metal plate provided with hems or flanges constituting hole sealing portions around a plurality of openings constituting combustion chamber holes, and a metal plate provided with notch portions between the openings adjacent to each other by providing to partially overlap the plurality of openings constituting the combustion chamber hole. In the steel laminate gasket, notch holes (fixation holes) are formed between the openings adjacent to each other in the metal plate having no notch portion, and the metal plate with notch portions includes projection portions (claw portions) facing each other. The projection portion (claw portion) is inserted into the notch hole to be engaged (for example, Japanese Utility Model Publication No. 05-59050).

In order to connect two plates with a simple structure and furthermore to facilitate the connecting operation, the metal-laminate type gasket laminating two metal plates includes, at a proper position of the inner surface of a metal-laminate type gasket, includes a tongue piece (claw portion) in one of the two plates by cutting a part of the plate, and a fixation hole for inserting the tongue piece in the other plate. The tongue piece in the one of the two plates is inserted through the fixation hole in the other plate to thereby project toward the other side. Thus, the tongue piece is engaged to the periphery of the fixation hole so that the two laminated plates are fixed each other (for example, Japanese Utility Model Publication No. 06-20955).

However, when the connecting method described above is employed, a thickness of the local connecting portion is increased from the periphery portion with the amount of the tongue piece engaging the periphery of the fixation hole.

Also, recently, in a metal-laminate type gasket laminating a plurality of metal plates, the two plates are connected at a local connecting portion by laser or spot welding. Even though this method is employed, a thickness of the local connecting portion is made greater than that of the periphery portion.

In a state that the thickness of the local connecting portion is increased, when a connecting force is applied between the two members located both sides of the metal-laminate type gasket, a significant high surface pressure is locally generated at the portion where the thickness is locally increased.

Consequently, it can be considered that a third metal plate covers the connecting portion of the two metal plates to thereby disperse the surface pressure. However, when a strong connecting force is applied between engine members, the portion where the thickness is increased abuts against the third metal plate to thereby locally generate a significant high surface pressure at the portion.

Therefore, there has been a problem that the position of the local connecting portion is required to be limited to a portion where sealing property is not affected by the high surface pressure generated, i.e. both ends of the gasket where it is unrelated to sealing or a water jacket portion or the like.

The present invention has been made to solve the above problems, and an object of the present invention is to provide a metal-laminate type gasket formed of more than three metal plates, wherein two of the metal plates, i.e. a first and a second metal plates, are connected at a local connecting portion. In the metal-laminate type gasket, an increase of local surface pressure can be prevented from generating at the connecting portion.

SUMMARY OF THE INVENTION

In order to achieve the above objects, a metal-laminate type gasket according to the present invention is formed of more than three metal plates to connect two of the metal plates, i.e. a first and a second metal plates at a local connecting portion. The metal-laminate type gasket is provided with an opening located at a position facing the connecting portion in a third metal plate covering the connecting portion.

When a strong connecting force is applied between engine members, the local connecting portion having a thickness increased by the connecting operation, does not abut against the third metal plate by the opening. Thus, a high surface pressure can be prevented from generating locally at the connecting portion. Also, the connecting portion can be confirmed from the opening so that an inspection of the connecting portion becomes easy.

In addition, when the metal-laminate type gasket locally connects the first and second metal plates with a structure that a claw portion provided in the first metal plate is engaged to a periphery portion of a fixation hole opened in the second metal plate or an end portion of the second metal plate, the two plates are connected with a simple structure and furthermore the connecting operation can be facilitated.

When the structure of the metal-laminate type gasket described above is applied to a cylinder head gasket, an effect described above can be greatly obtained. Especially, when the structure of the metal-laminate type gasket is applied to a cylinder head gasket having a bore sealing plate with a structure that the first or the second metal plate is a sealing plate for sealing more than one hole among a hole for cylinder bore, a water hole, and oil hole, the connecting portion can be provided near a bead for sealing or the like. Accordingly, the connecting portion is not required to be located away from the bead. Thus, the bore sealing plate can be formed with a small size required for sealing.

Therefore, in the metal-laminate type gasket with the structure described above, a layout structure, such as locations of various holes and the connecting portion of the gasket and the like, can be facilitated.

According to the metal-laminate type gasket of the present invention, the metal-laminate type gasket is formed of more than three metal plates and two of the metal plates, i.e. the first and the second metal plates, are connected at the local connecting portion. Since the opening is provided at the position facing the connecting portion in the third metal plate covering the connecting portion, the local surface pressure can be prevented from generating at the connecting portion.

Accordingly, the connecting portion can be provided near the bead requiring a sealing property. Thus, the layout structure of various holes and the connecting portion of the gasket and the like, can be facilitated.

Also, when the claw portion provided in the first metal plate is engaged with the periphery portion of the fixation hole opened in the second metal plate or the end portion of the second metal plate, the two metal plates can be connected with the simple structure and furthermore a connecting operation can be facilitated.

DETAILED DESCRIPTION OF PREFERRED EMBODIMENTS

Next, a metal-laminate type gasket of the embodiments according to the present invention will be explained with an example of a cylinder head gasket for an engine in reference to the accompanying drawings. FIGS. 1 to 8 are schematically explanatory drawings showing a structure for an easy understanding. Thus, the sizes of the holes for cylinder bores, fixation holes, beads, wave beads and the like are different from actual sizes.

The metal-laminate type gasket is the cylinder head gasket sandwiched between two engine members, such as a cylinder head and a cylinder block (cylinder body), for sealing a high temperature and pressure combustion gas of the cylinder bore and liquids, such as cooling water and oil passing through a cooling water path and a lubricating oil path.

As shown in FIGS. 1 to 4, the cylinder head gasket 1 is formed of three metal plates, i.e. a lower plate (a first metal plate) 10, a bore sealing plate (sealing plate: a second metal plate) 20, and an upper plate (a third metal plate) 30.

Figure 1:
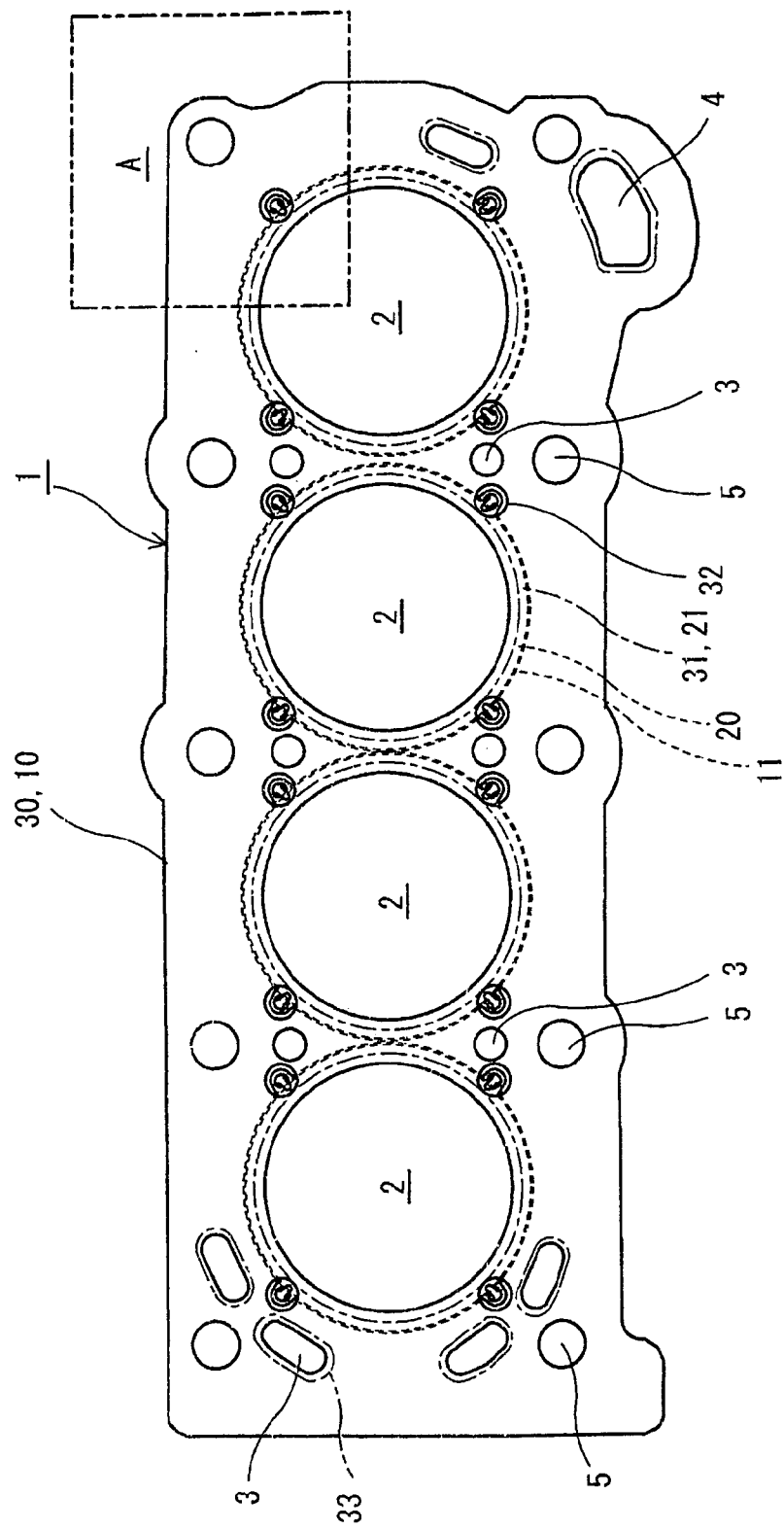
FIG. 1 is a plan view showing a cylinder head gasket of an embodiment according to the present invention.

The cylinder head gasket 1 is designed for an engine with a plurality of cylinders, and is produced in accordance with a shape of the engine member, such as the cylinder block and the like. As shown in FIG. 1, the cylinder head gasket 1 comprises holes 2 for cylinder bores (holes for a combustion chamber), water holes 3 for circulation of the cooling water, oil holes 4 for circulation of an engine oil, head bolt holes 5 for tightening head bolts, and the like. Also, sealing means, such as full beads 21 and 31, are provided around the holes 2 for cylinder bores.

The lower plate 10 is a metal plate constructing a plain portion (flat portion) located at lower side of the cylinder head gasket 1, and is made from a mild steel plate, a stainless annealed material (anneal material), a stainless thermal refining material (spring steel plate) or the like for sealing the cooling water and the lubricating oil. Engaging holes 11 are provided for installing the bore sealing plate 20 around the holes 2 for the cylinder bores.

The bore sealing plate 20 is a ring-shaped plate having the full bead 21 to seal a periphery of the hole 2 for the cylinder bore, and is made from a mild steel plate, a stainless annealed material (anneal material), a stainless thermal refining material (spring steel plate) or the like for sealing the combustion gas and the cooling water. The ring-shaped bore sealing plate 20 is installed in the engaging hole 11 in the lower plate 10 for sealing the periphery of the hole 2 for the cylinder bore. A material of the bore sealing plate 20 may be different from the materials of the other plates 10 and 30. Even if the material of the bore sealing plate 20 is the same as the other plates 10 and 30, a step may be provided by making the plate thickness thicker.

The upper plate 30 is a metal plate constructing an upper side of the cylinder head gasket 1, and is made from a mild steel plate, a stainless annealed material (anneal material), a stainless thermal refining material (spring steel plate) or the like for sealing the combustion gas, the cooling water, and the lubricating oil. The second full beads 31 are provided around the holes 2 for the cylinder bores in the upper plate 30.

In the structure of the cylinder head gasket in FIGS. 1 to 8, the first full beads 21 and the second full beads 31 are formed to project toward inner side of the cylinder head gasket 1 and the projecting portions are installed to face each other. The present invention is not limited to the sealing means with the structure.

Figure 2:
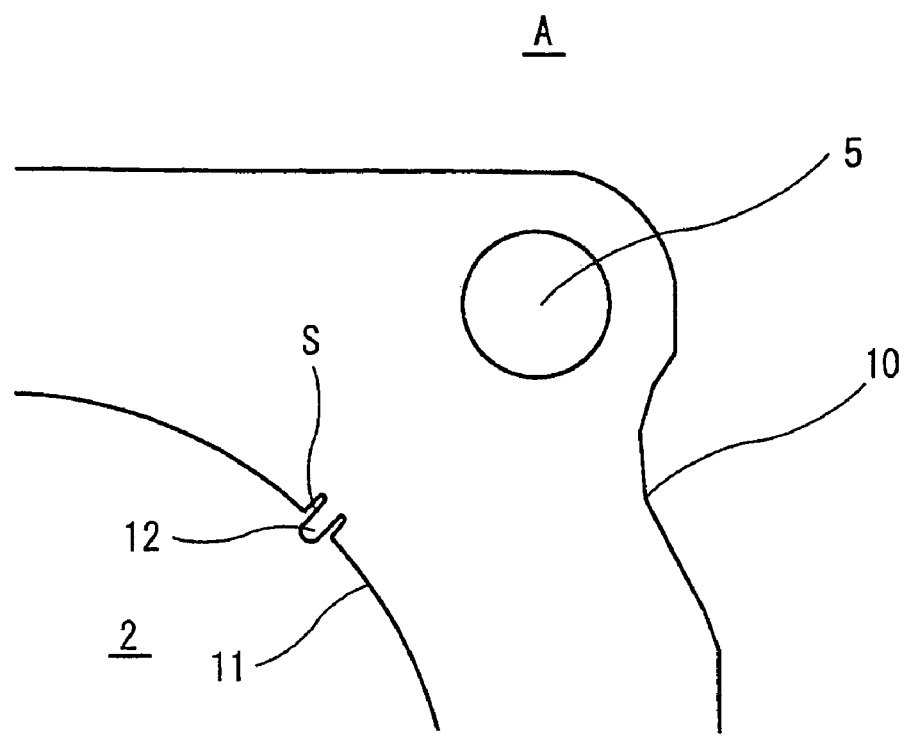
FIG. 2 is a partial plan view showing a lower plate at a portion A in FIG. 1.

In the present invention, as shown in FIG. 2, a claw portion 12 is provided in the lower plate 10. The claw portion 12 is formed to project with a tongue piece shape at the periphery of the engaging hole 11 or to cut into the periphery portion of the engaging hole 11 with the tongue piece shape (U-shape). In FIG. 2, a part of the claw portion 12 on the tip is formed to project toward the inner side from the periphery of the engaging hole 11.

When the claw portion 12 is formed by cutting the periphery of the engaging hole 11 with a tongue piece shape (U-shape), it is preferable that an enough width is allowed in the cutting portion to have a space S around the claw portion 12. Thus, even if a pressure is applied to an insert portion of the claw portion 12 into the fixation hole 22 after the lower plate 10 and the bore sealing plate 20 are connected, a great shearing force can be prevented from being applied to vicinity of the base portion of the claw portion 12 to thereby prevent a shearing failure of the lower plate 10 by the shearing force.

Figure 3:
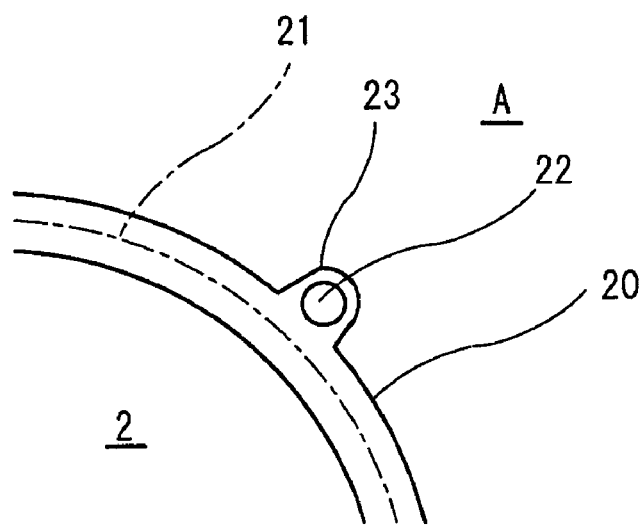
FIG. 3 is a partial plan view showing a bore sealing plate at the portion A in FIG. 1.

As shown in FIG. 3, the fixation hole 22 is provided in a projecting portion 23 outside from the outer periphery of the bore sealing plate 20. The fixation hole 22 allows the claw portion 12 of the lower plate 10 to enter from the lower side of the bore sealing plate 20 and project toward the other side (upper side in FIG. 5), and the projecting portion is bent in a crank shape so that the claw portion 12 is engaged at the end portion therein.

Figure 4:
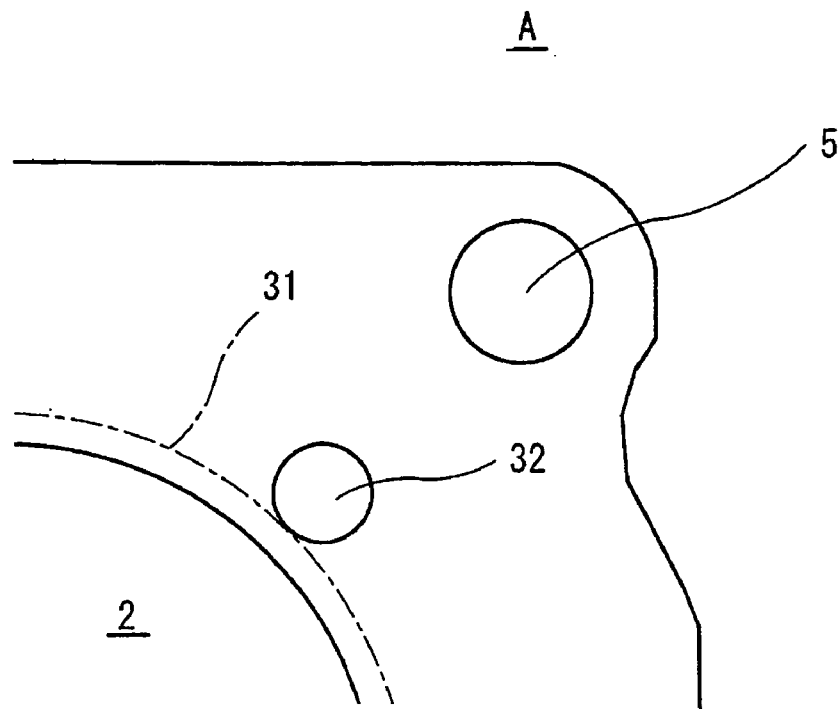
FIG. 4 is a partial plan view showing an upper plate at the portion A in FIG. 1.

Furthermore, as shown in FIG. 4, an opening 32 is provided at a local connecting portion of the claw portion 12 and the fixation hole 22, i.e. a portion located at the upper side of the claw portion 12 in the upper plate 30. The opening 32 stores the cranked claw portion 12 in the opening portion to thereby prevent the claw portion 12 engaging the circumference of the fixation hole 22, i.e. the connecting portion, from abutting against the upper plate 30. Thus, a significant high surface pressure is prevented from being locally generated at the portion by the opening 32.

In regard to the claw portion 12, the fixation hole 22, and the opening 32, in a state that the claw portion 12 is inserted into the fixation hole 22, in order to prevent the claw portion 12 from coming off from the fixation hole 22 when the lower plate 10 and the bore sealing plate 20 slide past each other relatively, it is preferable that the claw portion 12 and the fixation holes 22 are provided to be a pair around the bore sealing plate 20 and furthermore to provide the claw portions 12 to face in the opposite directions back-to-back. Also, the pairs of the claw portion 12 and the fixation hole 22 are preferably provided in not only one direction, but also more than two directions crossing each other.

Figure 5:
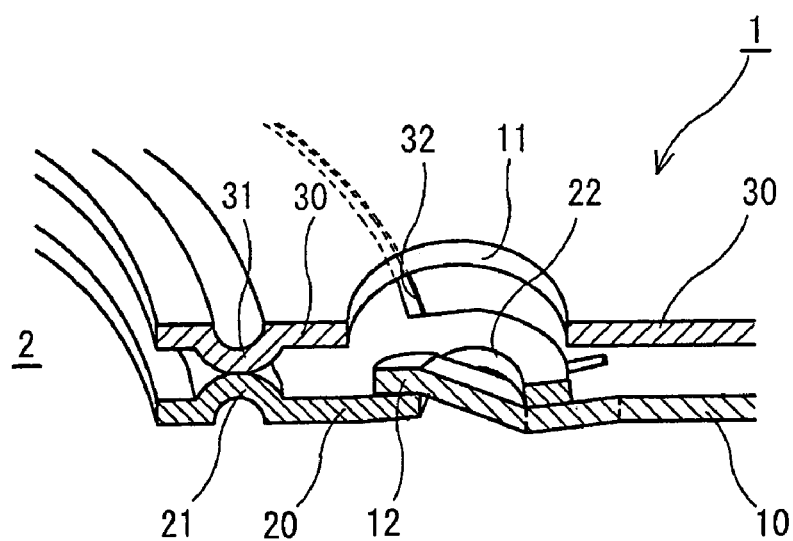
FIG. 5 is a partial sectional view showing a connecting portion of the cylinder head gasket.

As show in FIG. 5, when the lower plate 10 and the bore sealing plate 20 are connected, the claw portion 12 of the lower plate 10 is stood near-upright to thereby be inserted into the fixation hole 22 in the bore sealing plate 20. The end portion of the claw portion 12 projecting toward the other side is cranked so that the lower plate 10 and the bore sealing plate 20 are connected.

The upper plate 30 is provided on the two plates connected each other. The upper plate 30 is combined with the two plates by clinching, riveting, folding back, welding, and the like.

Figure 6:
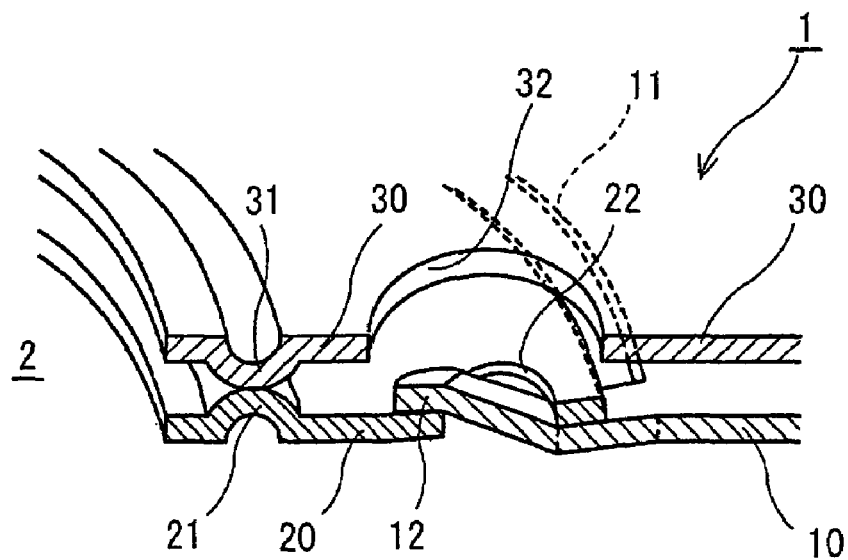
FIG. 6 is a partial sectional view showing another connecting portion of the cylinder head gasket.

FIG. 6 shows a case that the lower plate 10 and the bore sealing plate 20 are connected at a side of the bore sealing plate 20 with a structure that the claw portion 12 is provided to project toward an inner side from the inner periphery of the engaging hole 11 in the lower plate 10. Also, the fixation hole 22 is provided at an inner side from the outer periphery of the bore sealing plate 20. Thus, the lower plate 10 and the bore sealing plate 20 can be connected at a side of the lower plate 10. Although not shown in FIG. 6, the claw portion 12 is provided not to project toward inner side from the inner periphery of the engaging hole 11 in the lower plate 10, and is provided at the inner periphery of the engaging hole 11 by cutting the periphery of the engaging hole 11. Also, the fixation hole 22 is provided to significantly project from the outer periphery of the bore sealing plate 20. Thus, the claw portion 12 can be connected at the lower plate side. A proper connecting portion can be selected according to the outer periphery of the bore sealing plate 20 by selecting properly a structure from the structures described above.

According to the cylinder head gasket 1 with the structure described above, the two plates of the lower plate 10 and the bore sealing plate 20 can be connected by a simple operation to thereby attain automation easily. Furthermore, the upper plate 30 covering the upper side of the claw portion 12 is provided with the opening 32 at the portion facing the claw portion 12. Thus, the claw portion 12 can be prevented from abutting against the upper plate 30 to thereby prevent the local surface pressure from increasing at the connecting portion.

In the above explanation, the lower plate 10 is regarded as the one of the metal constituting plates provided with the claw portion, and the bore sealing plate 20 is regarded as the other metal plate provided with the fixation hole. However, the bore sealing plate 20 may be regarded as the one of the metal constituting plates provided with the claw portion, and the lower plate 10 may be regarded as the other metal constituting plate provided with the fixation hole. Also, the connecting structure described above can be employed not only to the bore sealing plate 20 for sealing the hole 2 for cylinder bore, but also a sealing plate (not shown) for sealing the water holes 3 and oil holes 4 as well as the bore sealing plate 20.

Figure 7:
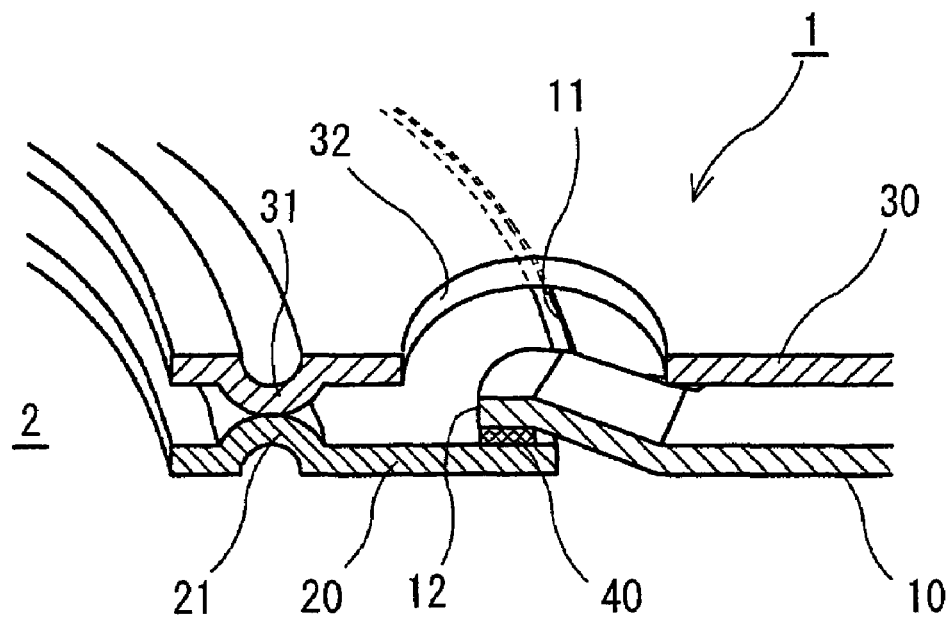
FIG. 7 is a partial sectional view showing a claw portion of the connecting portion of the cylinder head gasket by welding.
Figure 8:
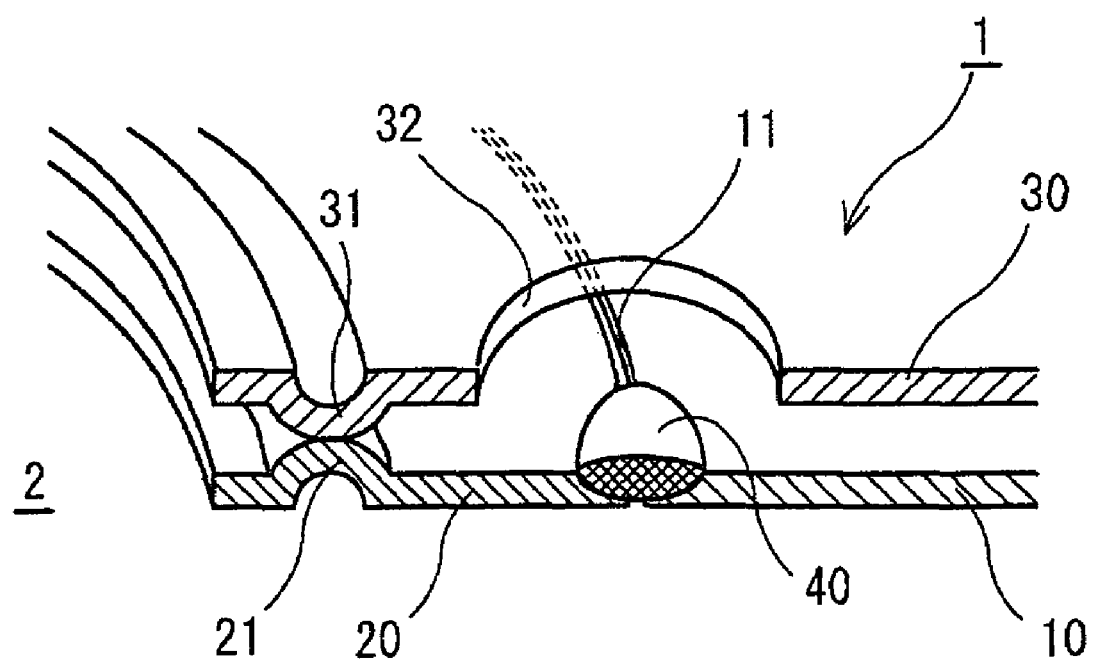
FIG. 8 is a partial sectional view showing the connecting portion by abutting spot welding of the cylinder head gasket.

As other embodiments, FIG. 7 shows a case that the claw portion 12 of the lower plate 10 is connected to the bore sealing plate 20 by a welding 40. FIG. 8 shows another case that the lower plate 10 is connected to the bore sealing plate 20 by butt spot-welding 40.

In the cases described above, the connecting portion having the thickness increased by the welding 40 is prevented from abutting against the upper plate 30 to thereby prevent the local surface pressure from increasing at the connecting portion.

The disclosure of Japanese Patent Application No. 2005-306894 filed on Oct. 21, 2005 is incorporated as a reference.

While the invention has been explained with reference to the specific embodiments of the invention, the explanation is illustrative and the invention is limited only by the appended claims.

What is claimed is:

1. A metal laminate gasket, comprising:
a first metal plate having a bore,
a second metal plate having a ring shape and disposed in the bore of the first metal plate,
a connecting portion partially connecting the first and second metal plates, said connecting portion comprising a claw portion projecting laterally inward from an edge of one of the first and second metal plates and engaging an edge of the other of the first and second metal plates, and
a third metal plate having an opening located at a portion facing the connecting portion,
wherein said connecting portion further comprises a fixation hole formed in the other of the first and second metal plates, said claw portion entering the fixation hole to engage a periphery thereof.

2. A metal laminate gasket, comprising:
a first metal plate having a bore,
a second metal plate having a ring shape and disposed in the bore of the first metal plate,
a connecting portion partially connecting the first and second metal plates, said connecting portion comprising a claw portion projecting laterally inward from an edge of one of the first and second metal plates and engaging an edge of the other of the first and second metal plates, and
a third metal plate having an opening located at a portion facing the connecting portion,
wherein said connecting portion further comprises a fixation hole formed in the other of the first and second metal plates, said claw portion entering the fixation hole to engage a periphery thereof, and
wherein said claw portion is defined by slits at two sides thereof.

3. A metal laminate gasket according to claim 2, wherein the other of the first and second metal plates includes a projecting portion extending laterally outwardly therefrom, said projecting portion having said fixation hole.

* * * * *